(12) United States Patent
Moran

(10) Patent No.: US 8,284,033 B2
(45) Date of Patent: Oct. 9, 2012

(54) OBJECT TRACKING

(75) Inventor: Humberto Moran, Newburgh Ellon (GB)

(73) Assignee: Friendly Technologies Ltd., Coventry (GB)

( * ) Notice: Subject to any disclaimer, the term of this patent is extended or adjusted under 35 U.S.C. 154(b) by 684 days.

(21) Appl. No.: 12/226,107

(22) PCT Filed: Apr. 16, 2007

(86) PCT No.: PCT/GB2007/050197
§ 371 (c)(1),
(2), (4) Date: Oct. 8, 2008

(87) PCT Pub. No.: WO2007/122425
PCT Pub. Date: Nov. 1, 2007

(65) Prior Publication Data
US 2009/0273450 A1    Nov. 5, 2009

(30) Foreign Application Priority Data

Apr. 22, 2006   (GB) .................................. 0608152.5

(51) Int. Cl.
*H04Q 5/22* (2006.01)
(52) U.S. Cl. ...................................... 340/10.4; 340/10.1
(58) Field of Classification Search ................ 340/10.1, 340/10.4
See application file for complete search history.

(56) References Cited

U.S. PATENT DOCUMENTS

| | | | |
|---|---|---|---|
| 3,713,148 A | 1/1973 | Cardullo et al. | |
| 6,307,475 B1 * | 10/2001 | Kelley | 340/573.1 |
| 6,342,830 B1 * | 1/2002 | Want et al. | 340/10.1 |
| 6,353,406 B1 * | 3/2002 | Lanzl et al. | 342/118 |
| 6,608,551 B1 * | 8/2003 | Anderson et al. | 340/10.51 |
| 6,617,962 B1 * | 9/2003 | Horwitz et al. | 340/10.4 |
| 2004/0063595 A1 | 2/2004 | Kenny et al. | |
| 2004/0135674 A1 | 7/2004 | Shanks et al. | |
| 2005/0017844 A1 | 1/2005 | Cole | |
| 2006/0022800 A1 * | 2/2006 | Krishna et al. | 340/10.2 |
| 2006/0022801 A1 * | 2/2006 | Husak et al. | 340/10.5 |
| 2006/0028352 A1 | 2/2006 | McNamara et al. | |
| 2006/0038077 A1 | 2/2006 | Olin et al. | |
| 2006/0061475 A1 | 3/2006 | Moskowitz et al. | |
| 2006/0176152 A1 * | 8/2006 | Wagner et al. | 340/10.2 |
| 2007/0247315 A1 * | 10/2007 | Nagai et al. | 340/572.4 |

FOREIGN PATENT DOCUMENTS

| | | |
|---|---|---|
| JP | 2003216782 | 7/2003 |
| JP | 2003532208 | 10/2003 |
| JP | 2004046904 | 2/2004 |
| JP | 2004508754 | 3/2004 |
| JP | 2004359459 | 12/2004 |
| JP | 2006050546 | 2/2006 |
| JP | 2007020237 | 1/2007 |
| WO | WO 01/82254 A1 | 11/2001 |
| WO | WO 02/21429 A2 | 3/2002 |
| WO | WO2005027022 | 3/2005 |
| WO | WO 2006011215 A1 * | 2/2006 |

* cited by examiner

Primary Examiner — Daniel Wu
Assistant Examiner — Mohamed Barakat
(74) Attorney, Agent, or Firm — Jacobson Holman PLLC

(57) ABSTRACT

A method of tracking an object (1) tagged with a radio frequency identification tag (2) having an identification code using a network of readers (3) is described. A reader (3) interrogates the tag (2) by transmitting its identification code. In response to receiving its identification code, the tag identifies itself to the reader. Otherwise, it does not identify itself. The method comprises identifying an expected location of the object and directing one or more selected readers according to the expected location to interrogate the tag using its identification code.

25 Claims, 8 Drawing Sheets

Tag readers in a facility

Tag readers in a facility

OBJECT TRACKING

This is a national stage of PCT/GB2007/050197 filed Apr. 16, 2007 and published in English.

FIELD OF THE INVENTION

The present invention relates to object tacking, in particular privacy-friendly object tracking.

BACKGROUND ART

Portable transponders, such as Radio Frequency Identification (RFID) tags, usually comprise one or more semiconductor chips for processing and storing data and an antenna for communicating with external devices, such as readers or "interrogators" and, via such readers, with other parts of supporting infrastructure. Typically, a transponder (hereinafter referred to simply as a "tag") is provided with a unique identifier (UID) assigned from a global numbering scheme. A tag may also have sensing capabilities, such as being provided with a sensor for detecting temperature, pressure etc.

Tags usually communicate with readers using radio waves propagating through, for example, air. However, other parts of the electromagnetic spectrum may be used, such as optical parts of the spectrum (e.g. visible or infra red regions), and other forms of signal propagation may be used, such as acoustic waves. The distance for interrogation varies from few millimeters to several meters depending on the type of tag and reader, frequency, media, antenna, interferences and other factors. Depending on their technical characteristics, RFID readers can concurrently interrogate many tags in quick sequence, for example several per second, usually in a round-robin approach.

Typically, RFID tags interact with readers which are interconnected to identification and actioning systems comprising a data network and computers running appropriate software. Herein, such identification and actioning systems are referred to as "RFID systems". These systems can trigger or perform a given action upon detection of a predetermined event. Examples of such actions include triggering replenishment transactions when stocks are reduced after object removal, firing an alarm upon temperature rise, or adding an item to the shopper's bill when they reach a till. RFID tags and supporting infrastructure (e.g. readers, data network and computers) provide an integral system for identifying and controlling objects and their environment. Neither the tag, nor the supporting infrastructure work in isolation. Therefore, within an RFID system, tags and the supporting infrastructure interoperate through, for example, standardisation of frequencies, protocols, interrogation procedures and numbering schemas and standardisation of protocols for the exchange of object identification and data.

In recent years, the use of RFID systems is becoming increasingly widespread. For example, RFID tags are attached to goods and products and these are managed by reading and writing information to and from the tags. This allows objects to be identified, tracked and traced, and their environmental conditions to be monitored.

RFID systems are employed in variety of fields such as manufacturing, logistics and distribution, amusement, rental and leasing. They can be applied, for example, in factories to manage the products or production materials being conveyed on a belt-type conveyor, in airports to manage baggage and in retail to track groceries. Leading manufacturers, distributors and retailers are promoting the use of RFID tags to replace barcode-based product identification procedures, to improve the visibility of their stock and to automate their operations.

RFID tags may be "passive", i.e. they have no internal energy source and obtain energy for their reply from the interrogation field, or they may be "active", i.e. contain an internal energy source, for example a battery. Tags usually reply only when they are within or have recently passed through an interrogation field. The interrogation field may function to select a single tag among a population of such tags, to issue a generic interrogation aimed at all the tags within the interrogation field, to issue a semi-generic interrogation aimed at some of the tags within the interrogation field, and/or, in the case of passive tags, to provide energy, a portion of which may be used in constructing the reply. Passive tags are described in U.S. Pat. No. 3,713,148.

Typically, RFID tags respond to interrogations by transmitting their UID and, optionally, other data. Some tags can communicate using encryption mechanisms, for example as described in US-A-2005/017844 and WO-A-2005/027022, although most tags, particularly passive tags, have no security or encryption mechanisms. In particular, the prohibitive cost of RFID tags with encryption capabilities hinders their usage in the tagging of fast moving consumer goods (FMCG) and other low-cost or low-margin objects. Moreover, due to cost efficiencies and security reasons, RFID tags in FMCG are usually "embedded" into the packaging or product itself, hence impeding or complicating their removal. More importantly, most RFID systems used in the control of FMCG typically reply overtly to generic or semi-generic interrogation from compatible readers, these are usually referred to as "talkative" tags.

For these reasons, adoption of RFID systems for the tracking of FMCG and other goods is facing significant opposition from privacy advocates and regulators because their usage might allow spying on consumers and exposing them to theft. For example, talkative tags can be interrogated by unauthorised parties through clothing, when in pockets or hand bags, and even through thin walls. Moreover, some RFID global numbering systems include the product type within their codification structure, so revealing important product characteristics such as product nature, price etc.

Consequently, some RFID advocates propose the removal or disabling of tags at the Point Of Sale (POS) and reference is made to US-A-2006/061475. However, this option has been rejected by some privacy advocates because the process is cumbersome, unreliable and hinders valuable post-POS applications, such as domestic applications, automatic recycling etc.

Similarly, temporary deactivation of tags may not satisfy privacy concerns. RFID protocol proposals include a kill command that renders the tag inoperable. This kill command is often referred to as a "Privacy" command, which can be used to permanently deactivate the device at the end of its working life, for example as a customer leaves a store. However, there are two problems associated with the kill command. Firstly, the execution of a kill command is only protected by a short password, for example 8 bits long. Organizations using RFID tags are therefore concerned that unauthorized people may be able to deactivate them even before point of sale. Secondly, privacy advocates are afraid that the kill command may not permanently "destroy" a tag. The entity that made the tag may also have means to reactivate it.

The present invention seeks to provide a method of and apparatus for tracking an object tagged with a radio frequency identification tag which is privacy friendly.

SUMMARY OF THE INVENTION

According to a first aspect of the present invention there is provided a method of tracking an object tagged with a radio frequency identification tag having a identification code using a network of readers, wherein a reader interrogates the tag is by transmitting its identification code and, in response to receiving its identification code, the tag identifies itself to the reader, the method comprising identifying an expected location of the object and directing one or more selected readers according to the expected location to interrogate the tag using its identification code.

This can help to provide a method of tracking objects which is privacy friendly.

In response to receiving a message comprising an identification code different to its identification code or in response to receiving a message not comprising an identification code, the tag may not identify itself.

In response to receiving its identification code, the tag may identify itself to the reader by transmitting a predefined message and/or by transmitting its identification code.

The method may further comprise receiving a communication that the object has entered a system and instructing all readers to poll the identification code. The method may further comprise determining whether at least one reader receives a response, identifying which readers do not receive a response and in response to at least one reader receiving a response, instructing the readers which do not receive a response to stop polling the identification code. The method may further comprise receiving a communication that the object has left a system and instructing readers to stop polling the identification code. The method may further comprise determining whether the tag stops responding to interrogation by a reader, identifying readers surrounding the location covered by the reader, the surrounding readers monitoring areas through which the object may pass and instructing the surrounding readers to poll the identification code. The method may further comprise determining whether the object has remained undetected for a given period of time and in response to determining that the object has remained undetected for the given period of time, instructing readers in a wider area to seek the object.

According a second aspect of the present invention there is provided a computer program which, when executed by a computer, causes the computer to perform the method.

According a third aspect of the present invention there is provided a computer program product comprising a computer-readable medium storing the computer program.

According to a fourth aspect of the present invention there is provided apparatus for tracking an object tagged with a radio frequency identification tag having an identification code using a network of readers, wherein a reader interrogates the tag by transmitting its identification code and, in response to receiving its identification code, the tag identifies itself to the reader, the apparatus comprising means for identifying an expected location of the object and means for directing one or more selected readers according to the expected location to interrogate the tag using its identification code.

The directing means may be configured, in response to receiving a communication that the object has entered a system, to instruct all readers to poll the identification code. The directing means may be configured to determine whether at least one reader receives a response, to identify which readers do not receive a response and, in response to at least one reader receiving a response, to instruct the readers which do not receive a response to stop polling the identification code. The directing means may be configured, in response to receiving a communication that the object has left a system, to instruct readers to stop polling the identification code. The directing means may be configured to determine whether the tag stops responding to interrogation by a reader, to identify readers surrounding the location covered by the reader, the surrounding readers monitoring areas through which the object may pass and to instruct the readers to poll the identification code. The directing means may be configured to determine whether the object has remained undetected for a given period of time; and, in response to determining that the object has remained undetected for the given period of time, to instruct readers in a wider area to seek the object.

The directing means may be computer connected to the network of readers. The apparatus may further comprise the network of readers. The directing means may be distributed within the network of readers.

According to a fifth aspect of the present invention there is provided a reader for interrogating a radio frequency identification tag, wherein the reader is configured to interrogate the tag by transmitting its an identification code and, in response to receiving its identification code, the tag identifies itself to the reader, the reader connectable to other radio frequency identification tag readers to form a network of readers, the reader comprising means for identifying an expected location of the object and means for directing one or more selected readers according to the expected location to interrogate the tag using its identification code.

According to a sixth aspect of the present invention there is provided system for the tracking and control of mobile objects in the industrial, domestic, and public environments using RFID Tags; said system allowing the usage of discreet RFID Tags attached to said objects, said Discreet Tags which cannot be interrogated by unauthorised readers; also comprising a method to deploy the network of readers, said method allowing for the tracking and authorised interrogation of all tagged objects without exceeding the technical capacity of readers, and without leaving unmonitored corridors or shadow zones through which said tagged objects can move without being detected; and an algorithm to direct the network of readers to follow said tagged objects as they move around by timely and precisely distributing the required object identifiers, and by sharing identification information with other systems if necessary, and more specifically when objects are incorporated into or leave the system.

BRIEF DESCRIPTION OF THE DRAWINGS

Embodiments of the present invention will now be described, by way of example, with reference to the accompanying drawings in which.

DETAILED DESCRIPTION OF THE INVENTION

Figure 1:
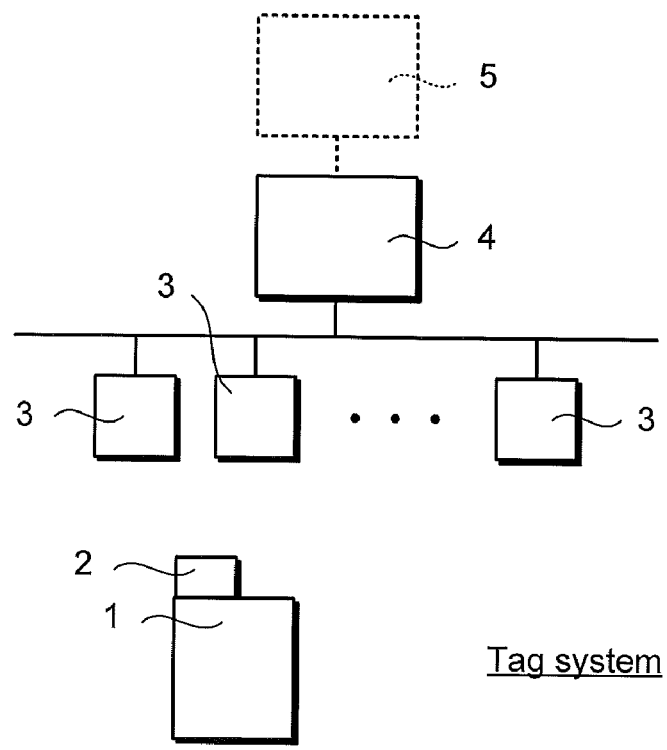
FIG. 1 is a schematic diagram of an embodiment of a tag system in accordance with the present invention.

Referring to FIG. 1, an embodiment of a privacy-friendly system for tracking at least one object 1 in accordance with the present invention is shown. The system includes at least one tag 2, each object 1 carrying a respective tag 2, at least one tag readers 3 and a controller 4. To help provide a privacy-friendly system, the tags 2 are discreet, i.e. they do not respond to generic or semi-generic interrogations or do not do so in a way that reveals their identity. The object 1 can carry more than one tag 2.

The tag 2 may be mounted on a surface of the object 1 or embedded within the object 1. The object 1 may be packaged and so the tag 2 may be carried by packaging (not shown) rather than the object 1 itself.

The tags 2 and readers 3 are configured to exchange signals through the radio frequency portion of the electromagnetic spectrum, i.e. the tags 2 and readers 3 are RFID tags 2 and RFID readers 3 respectively. However, the tags 2 and readers 3 may be configured to exchange signals through other portions of the electromagnetic spectrum, e.g. visible or infrared, or using other forms of propagation, such as acoustic waves As will be described in more detail later, the readers 3 are arranged to cover points of access to delimited areas, such as corridors, rooms, buildings or other closed areas, such that an object 1 can be tracked as it enters or leaves a delimited area.

The controller 4 is a separate unit, for example, a computer 17 (FIG. 9) which executes a computer program 25 (FIG. 9) for predicting and following movement of objects 1 and which selectively directs readers 3 to transmit an interrogation message. The controller 4 may also trigger actions and communicate with other systems 5. In some embodiments, the function of the controller 4 may be executed by one or more readers 3 and, thus, the separate controller 4 may be omitted. A reader 3 which executes functions of the controller is referred to as an "intelligent reader".

Figure 2:
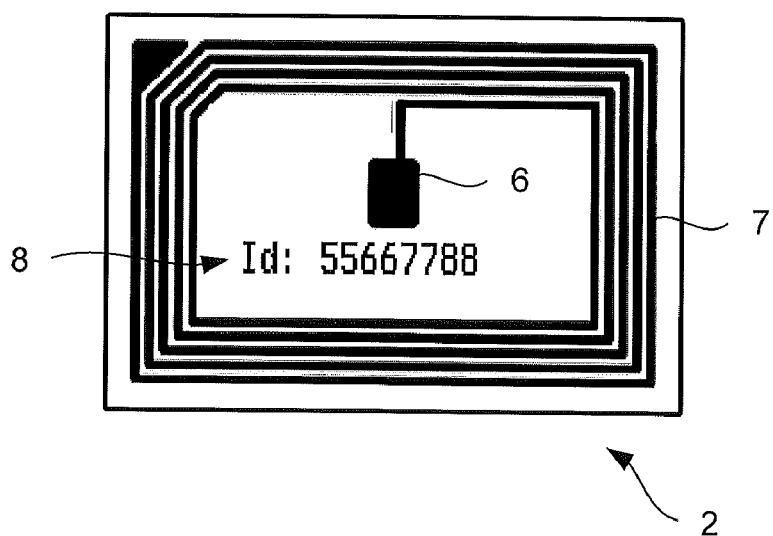
FIG. 2 is a schematic diagram of a tag.

Referring to FIG. 2, the discreet tag 2 is similar to commonly-used types of RFID tag in that it has a chip 6 connected to an antenna 7. The tag 2 is assigned a unique identifier (UID) 8 from a global numbering scheme, stored in the chip 6 and which, optionally, may also be displayed on the tag 2, for example as shown in FIG. 2. The tags 2 may provide other data and/or sensing information.

The discreet tag 2 is passive, i.e. it has no internal energy source and obtains energy for its reply from an interrogation field. However, the tags 2 may include a battery and may be active.

The discreet tag 2 differs from the commonly-used RFID tags in that the internal logic of the chip 6 is different. Instead of overtly transmitting its UID and data upon generic or semi-generic interrogation, the discreet tag 2 only replies when specifically interrogated with its UID and, optionally, a password. Otherwise, the discreet tag 2 stays silent. Thus, the discreet tag 2 is not "talkative" like most RFID tags.

Behaviour of the discreet tag 2 is equivalent to answering only closed questions such as "Is your id 453455?", as opposed to the behaviour of typical RFID tags that overtly respond to open questions such as "What is your id and data?".

To improve the security of discreet tags 2, their UID can be extended by adding a random password generated at time of manufacture. For increased security, the tag 2 may be programmable so that the password can be changed by owners (users or consumers). Extending the UID by adding a randomly-generated password makes it more difficult for unauthorised persons to guess the UID of a tagged object 1 by trial-and-error. For clarity, references to "UID" are intended to include a UID+password. The UID is a unique identifier and is difficult to guess. This is generally this is achieved by making the identifier a long number (for example, 96-bits long) and, optionally, providing a randomly-generated part.

As explained earlier, discreet tags 2 only reply when interrogated with exactly their UID (i.e. correct interrogation) and remain silent otherwise. However, discreet tags 2 may be modified such that they reply with a standard "negative" signal when interrogated generically, semi-generically, or with the wrong UID (i.e. incorrect interrogation).

When correctly interrogated, a discreet tag 2 can respond with (a) their UID, (b) their UID plus other data and sensing information, (c) other data and sensing information, (d) a standard "I am here" signal, or (e) a standard "I am here" signal plus other data and sensing information.

Figure 3:
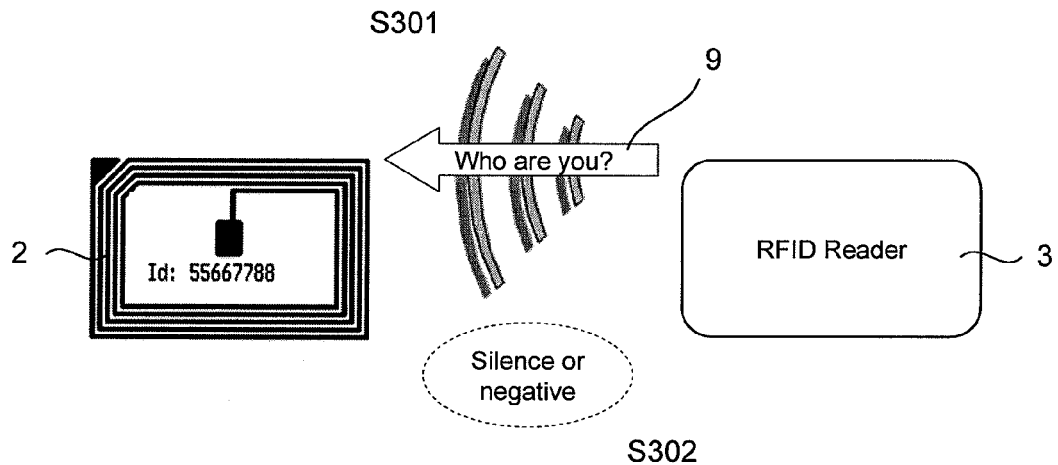
FIG. 3 illustrates operation of a tag when interrogated with generic or semi-generic query or a query using an incorrect tag identifier.
Figure 4:
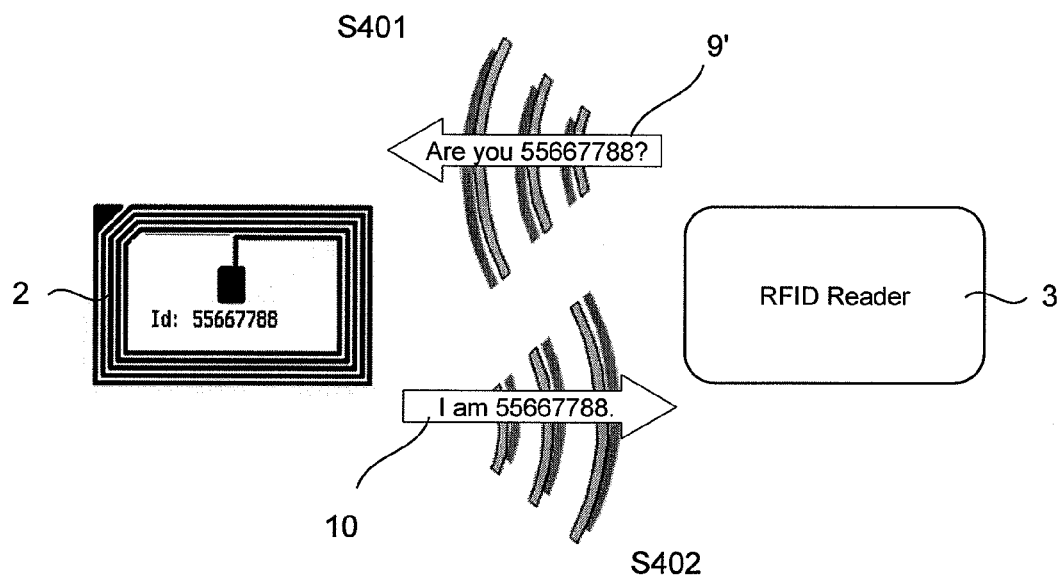
FIG. 4 illustrates operation of a tag when interrogated with a query using a correct tag identifier.

Referring to FIGS. 3 and 4, operation of a discreet tag 2 in response to interrogation by a reader 3 is shown.

Referring in particular to FIG. 3, when the reader 3 interrogates the discreet tag 2 by sending a signal 9 (also referred to herein as an "interrogation message") which is generic or semi-generic, or specific but carrying the incorrect UID (step S301), the discreet tag 2 does not reply (step S302). Alternatively, the discreet tag 2 sends a negative reply.

Referring in particular to FIG. 4, if the reader 3 interrogates the discreet tag 2 by sending a signal 9' with the UID specific to the tag 2 (step S401), then the discreet tag 2 sends a reply 10, for example comprising its UID and, optionally, other data (step S402).

Figure 5:
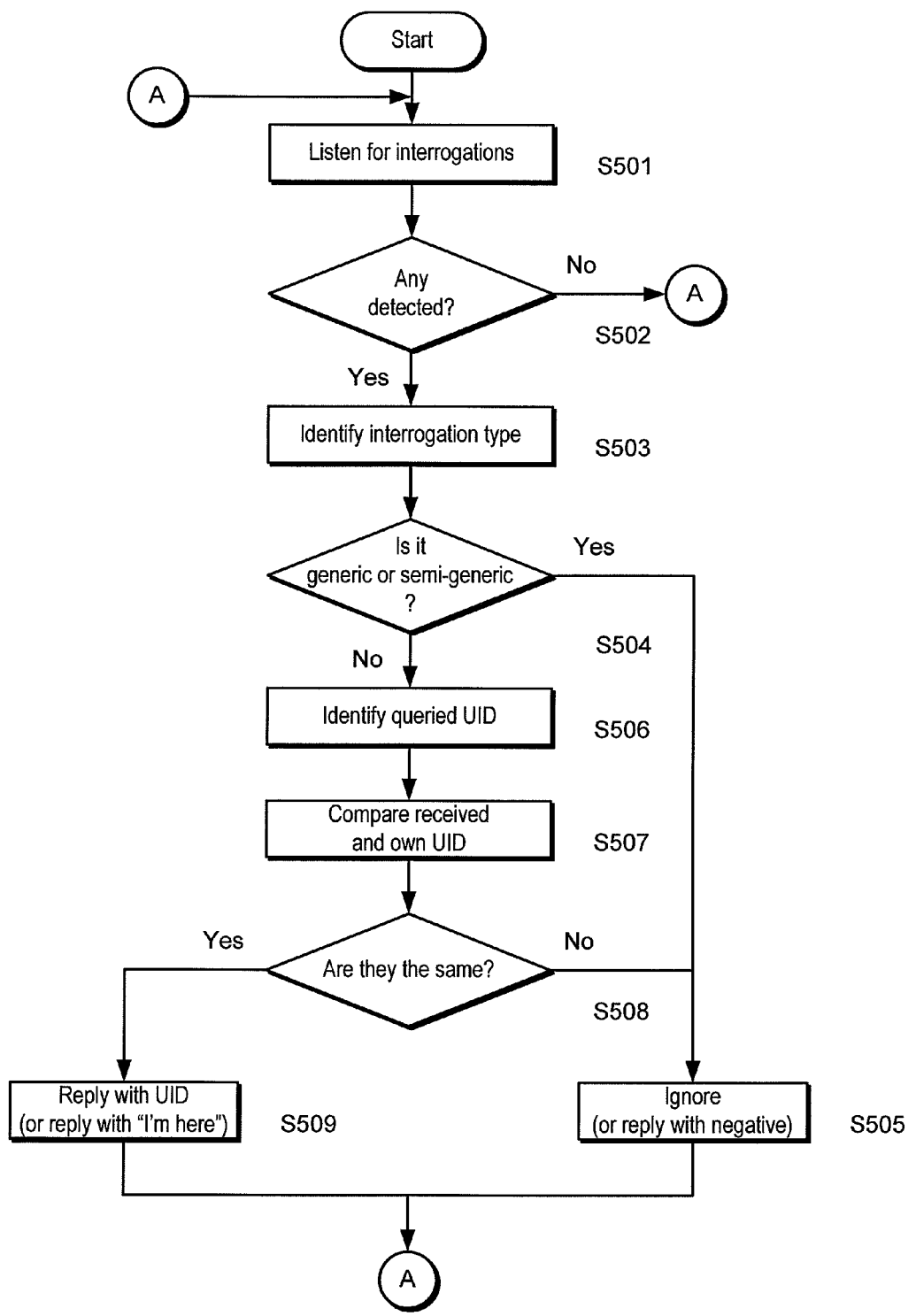
FIG. 5 is a flow diagram of a process performed by a tag.

Referring still to FIGS. 3 and 4 and also to FIG. 5, a flow diagram of a process performed by the logic of the discreet tag 2 is shown.

The tag 2 listens or waits for an interrogation message 9, 9' (step S501). The tag 2 continues to listen or to wait for signals 9, 9' until it receives one (step S502). For a passive tag, receiving a signal provides power which allows subsequent steps to be performed.

When the tag 2 receives an interrogation message 9, 9', it identifies the type of interrogation (step S503), and determines whether the interrogation is generic or semi-generic (step S504).

If the interrogation is generic or semi-generic, then it ignores the message (step S505) and waits for the next interrogation (step S501). Instead of ignoring the message, the tag 2 may reply with a "negative" message.

If the interrogation is directed to a specific tag, then the tag identifies the UID (step S506) and compares the received UID with the tag UID, i.e. stored in the tag (step S507) and determines whether there is a match (step S508).

If both codes are equal (i.e. there is a match), then the tag 2 sends a reply 10 with identification and, optionally, other data (step S509). Alternatively, the tag may reply with an "I am here" signal 10. If the UIDs are different, then the tag 2 ignores the signal 9 and waits for the next interrogation or sends a "negative" replay (step S505).

Referring again to FIG. 1, in many industrial, commercial and other types of environment, tagged objects often move through specific paths and locations along a supply chain and within facilities, such as a plant or warehouse. In embodiments of the present invention, mobile objects 1 have discreet tags 2 attached and readers 3 are placed at doors, corridors and/or shelves along the paths through which the object 1 moves and locations at which objects are stored or kept.

The locations of readers 3 are chosen such that objects 1 in an area (e.g. a defined or delimited area) are covered by the interrogation field of at least one reader 3 or are "surrounded" by a readers 3 such that the object 1 crosses an interrogation field to leave (or enter) the area. In other words, the locations of readers 3 are chosen so as not to leave any unmonitored corridors or "shadow zones" along the possible paths along which an object 1 may move.

The readers 3 can be arranged to limit the number of tagged objects 1 to be tracked concurrently by each reader 3 within its interrogation cycle, which is limited by its tracking capacity.

The tracking capacity, TC, of a reader 3 is given by its interrogation speed, IS, which is the number of tags the reader 3 can interrogate per second and which depends on its characteristics and other technical factors frequency and protcol, by the distance, D, to the closest adjacent reader, by the length, L of its interrogation field along the path of the object and by the maximum potential object speed, OS.

This is to enable the reader 3 to detect the disappearance of an object 1 within its range and to notify surrounding readers before the object 1 reaches them and to be able to detect moving objects 1 before it cross its interrogation field.

Thus, the tracking capacity is expressed as:

$$TC \approx \min(IS \times (D/OS), IS \times (L/OS)) \quad (1)$$

Ideally, the layout of the readers 3 should be such that no tracking area or space can normally contain more objects than the individual tracking capacity of each surrounding reader, plus some margin for lost/misplaced objects, extra security, reading failures, and processing and other overheads. In small facilities containing relatively few tagged objects, a reader per door might suffice. Large facilities might require dozens of scattered readers.

Figure 6:
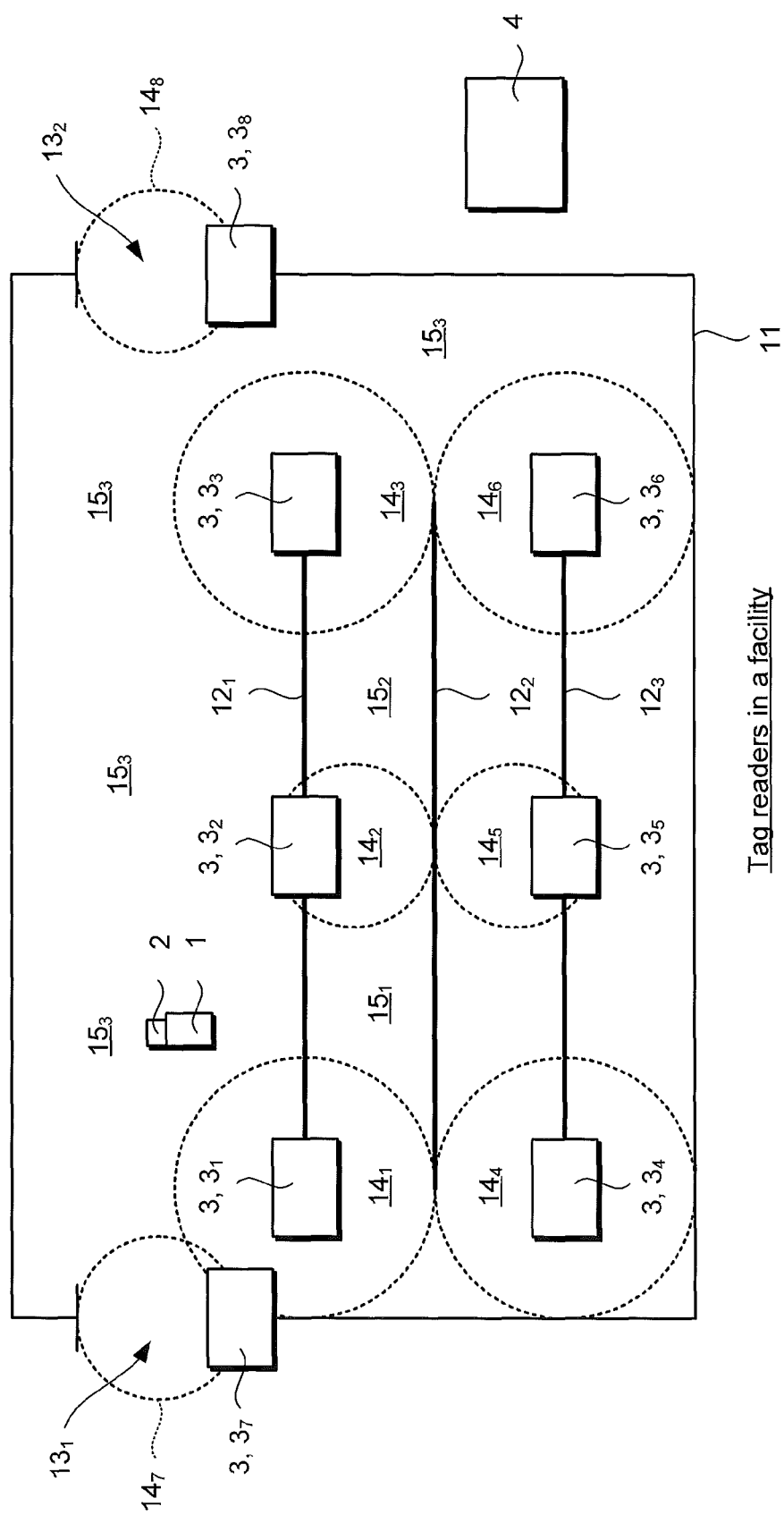
FIG. 6 illustrates an example of layout of tag readers within a facility.

Referring to FIG. 6, an example of a layout of readers 3 in a facility 11, such as a warehouse or supermarket, is shown. The facility 11 has three storage shelves $12_1$, $12_2$, $12_3$ arranged in parallel. The outer pair of shelves $12_1$, $12_3$ are each equipped with three readers $3_1$, $3_2$, $3_3$, $3_4$, $3_5$, $3_6$ at their ends and in the middle. The facility 11 is accessed via two doors $13_1$, $13_2$ each equipped with a respective reader $3_7$, $3_8$.

First, second, third, fourth, fifth, sixth, seventh and eighth readers $3_1$, $3_2$, ..., $3_8$ each have associated with it a respective interrogation field $14_1$, $14_2$, ..., $14_8$, shown in the FIG. 6 as a surrounding or adjacent circle, i.e. the readers $3_1$, $3_2$, ..., $3_8$ are either located at the centre or off centre to the interrogation field $14_1$, $14_2$, ..., $14_8$. The interrogation field $14_1$, $14_2$, ..., $14_8$ is the area in which a tag 2 and a reader $3_1$, $3_2$, ..., $3_8$ can interact.

In this example, the second reader $3_2$, is able to track concurrently tagged objects 1 in its interrogation field $14_2$ and also in first and second areas $15_1$, $15_2$ bounded by the first and second shelves $12_1$, $12_2$ and lying between the first and second interrogation fields $14_1$, $14_2$ and the second and third interrogation fields $14_2$, $14_3$. The eighth reader $3_8$ is able to track concurrently tagged objects 1 in its interrogation field $14_8$ and in a third area $15_3$ bounded by the inside of the facility 11 and by adjacent integrations fields $14_1$, $14_3$, $14_6$, $14_7$, $14_8$. The third reader $3_3$ is able to track concurrently tagged objects 1 in its interrogation field $14_3$ and in the second and third areas $15_2$, $15_3$.

A controller 4 running a computer program 25 (FIG. 9) is provided with knowledge of the layout of the facility 11 and keeps record of the last or current approximate location of tagged objects 1 (i.e. in terms of the last reader 3 which detected them) and directs seek operations accordingly, in other words directs specific readers 3 to transmit an interrogation message 9.

The controller 4 knows the location of the readers 3 and reacts when a tagged object strays 1 from the range of a given reader (i.e. when the object "disappears") by instructing surrounding readers 3 and/or readers 3 within the possible paths of the object 1 to seek it using its UID.

When an object 1 is detected by another reader 3 or by the original reader 3 (i.e. the reader 3 which previously detected the object 1), the controller 4 stops other readers 3 from looking for the object 1 and instructs the successful reader 3 (i.e. the reader 3 which currently detects the object 1) to keep polling it (i.e. keep transmitting the interrogation signal 9) so as "to keep an eye on it" until the cycle starts again. Optionally, when an object 1 is out of contact for a certain period of time, readers 3 within a wider area or within the whole facility 11 can be instructed to seek the tagged object 1 using its UID. This can help to provide security against "losing" the tag 2 should a reader 3 or network fail. The period of time depends upon the distance to the next set of neighbouring readers 3 and the speed of the object 1. As explained earlier, all or part of the functions of the controller 4 may be implemented by intelligent readers or in computers connected to the network of readers, either in a centralised or distributed approach.

Figure 7:
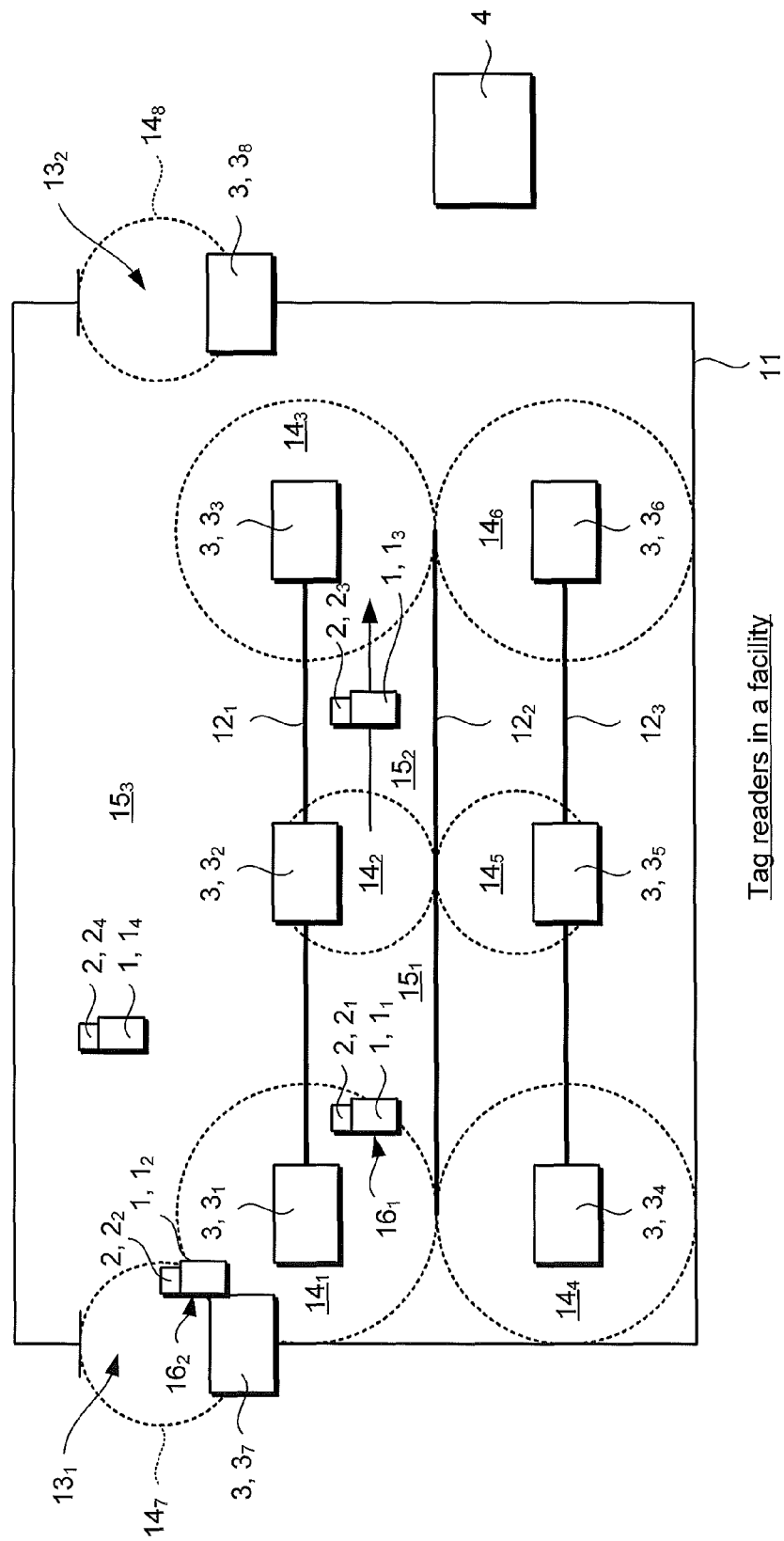
FIG. 7 illustrates selective activation of readers shown in FIG. 6.

Referring to FIG. 7, object tracking within the facility 11 will now be described.

In a first position $16_1$, a first object $1_1$ carrying a first tag $2_1$ is within range of the first reader $3_1$. Therefore, the controller 4 instructs only the first reader $3_1$ to poll the first tag's UID.

In a second position $16_2$, a second object $1_2$ carrying a second tag $2_2$ is within range of the first and seventh readers $3_1$, $3_7$. Therefore, the controller 4 instructs only the first and seventh readers $3_1$, $3_7$ to poll the second tag's UID.

A third object $1_3$ carrying a third tag $2_3$ is currently moving between the second and to third readers $3_1$, $3_3$. The third object $1_3$ is outside the reach (i.e. interrogation field) of any reader. The second reader $3_2$ is the last reader 3 to have detected it. Under this scenario, the controller 4 instructs first, second and third readers $3_1$, $3_2$, $3_3$ to look for the UID of third object $1_3$. The system does not know the direction of the movement, but knows that the third object $1_3$ cannot reach other areas without passing through the first or third interrogation fields $14_1$, $14_2$ or coming back to the second interrogation field $14_2$. Once the third object $1_3$ reaches the third reader $3_3$, the controller 4 instructs the first and second readers $3_1$, $3_2$ to stop polling the third tag's UID.

A fourth object $1_4$ carrying a fourth tag $2_4$ has been outside the reach of all readers 3 for a time longer than the threshold. Therefore, the controller 4 instructs all readers $3_1$, $3_2$, ..., $3_8$ in the facility 11 to look for the fourth tag $2_4$ by polling its UID.

In summary, using the layout of the readers 3 and the current locations of the tags 2 shown in FIG. 7, all readers $3_1$, $3_2$, ..., $3_8$ poll the UID of the fourth tagged object $1_4$, the seventh reader $3_7$ also polls the UID of the second tagged object $1_2$, the first reader $3_1$ also polls the UID of the first, second and third tagged objects $1_1$, $1_2$, $1_3$ and second and third readers $3_2$, $3_3$ also poll the UID of second tagged object $1_2$.

Figure 8A:
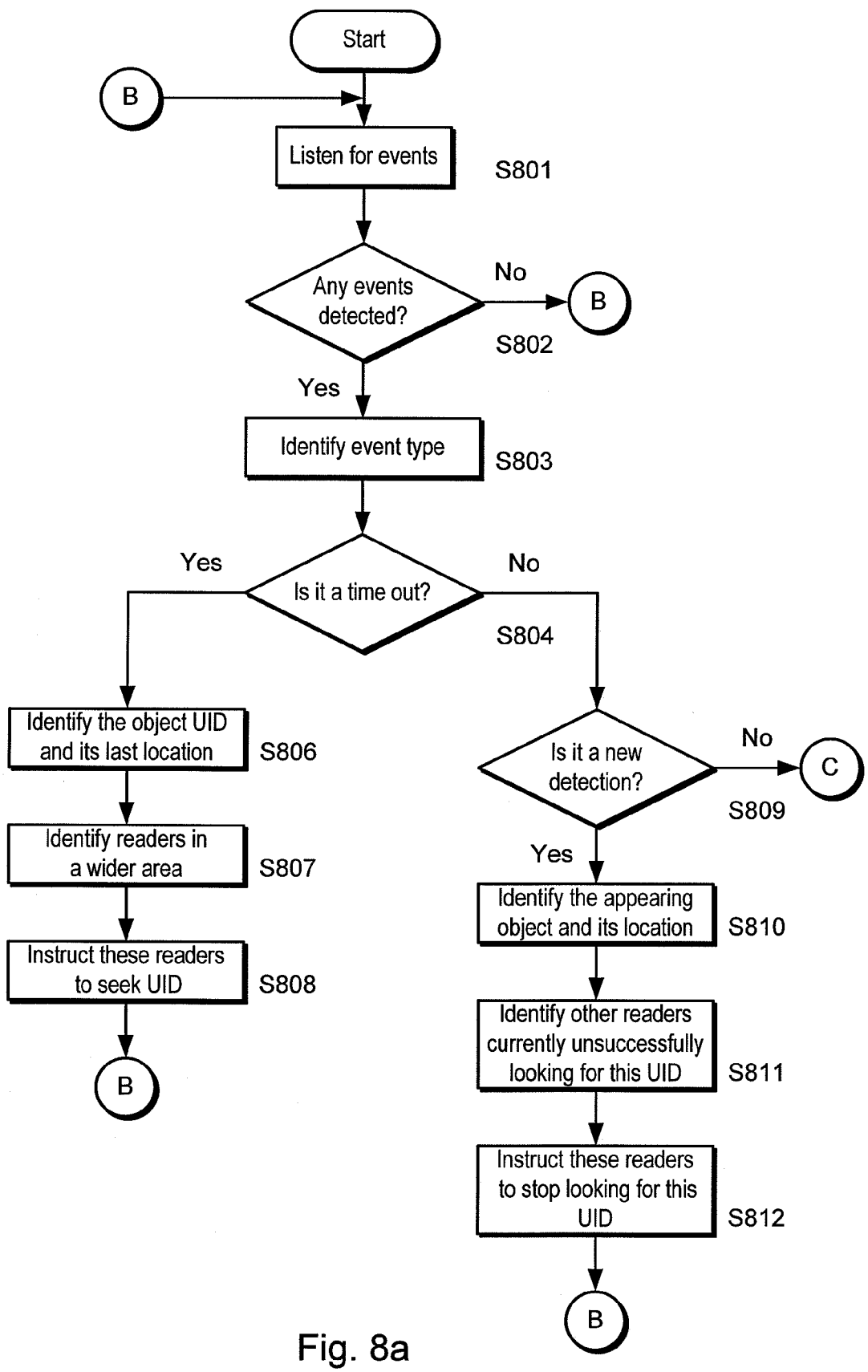
FIG. 8 is a flow diagram of a process performed by a controller.
Figure 8B:
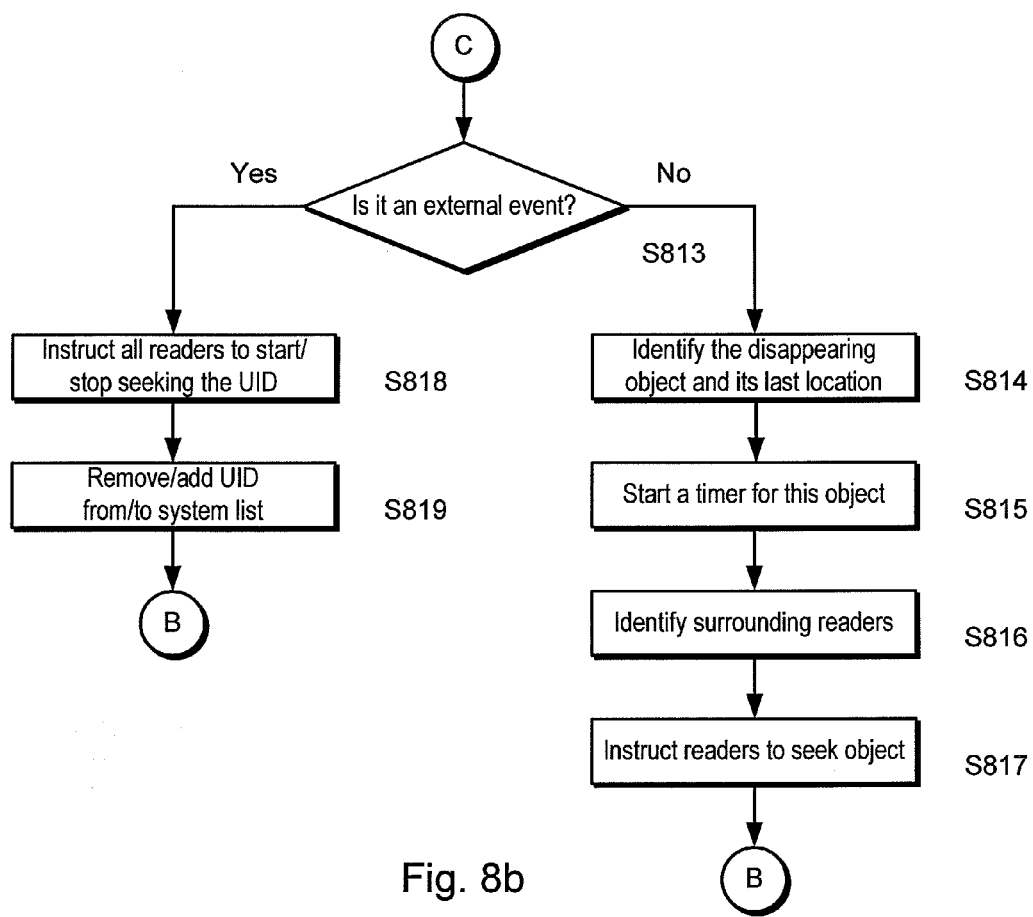

Referring to FIGS. 7 and 8, a flow diagram of a process performed by the controller 4 is shown.

The controller 4 listens for events (step S801). The controller 4 determines whether it has detected an event (step S802) and, if not, it continues to listen (step S801).

If the controller 4 detects an event, then it identifies the type of event (step S802). An event may be an appearance or disappearance of an object, as reported by a reader 3, an external event, such as object transfer to or from another facility or a sale or a time-out when an object 1 remains undetected for a specific period of time.

The controller 4 determines whether the event is a time out (step S804).

If the event is a time-out, the controller 4 identifies the object 1 and its last known location (step S806), identifies the readers 3 in a wider area around the last known location (step S807) and instructs these readers to look for the object 1 using object's UID (step S808). The controller 4 then continues to listen for events (step S801).

If the event is not a time-out, then the controller 4 determines whether the event is new detection (step S809).

If the event is a detection of a previously undetected UID, the controller 4 identifies the UID of the appearing object 1 and its location (step S810), identifies other readers currently (and unsuccessfully) seeking for this UID (step S811), and instructs these readers 3 to stop looking for it (step S812). The controller 4 then continues to listen for events (step S801).

If the event is not a new detection, then the controller 4 determines whether the event is an external event (step S813).

If the event is not an external event and is a disappearance of a UID, the controller 4 identifies the object 1 and its last known location (step S814), programs (i.e. starts) an event timer for this object (step S815), identifies surrounding readers 3 to the location where the object disappeared (step S816) and instructs these readers to look for the object (step S813).

If the event is the reception, transfer or sale of the object, as communicated by other systems such as inventory management or point-of-sale (POS), then all readers 3 are instructed to start/stop looking for the object's UID (step S818) and it is included/removed into/from the system (step S819).

It will be appreciated that events can be identified in a different order. For example, the controller 4 can determine whether an event is an external event before determining whether it is a time out.

Figure 9:
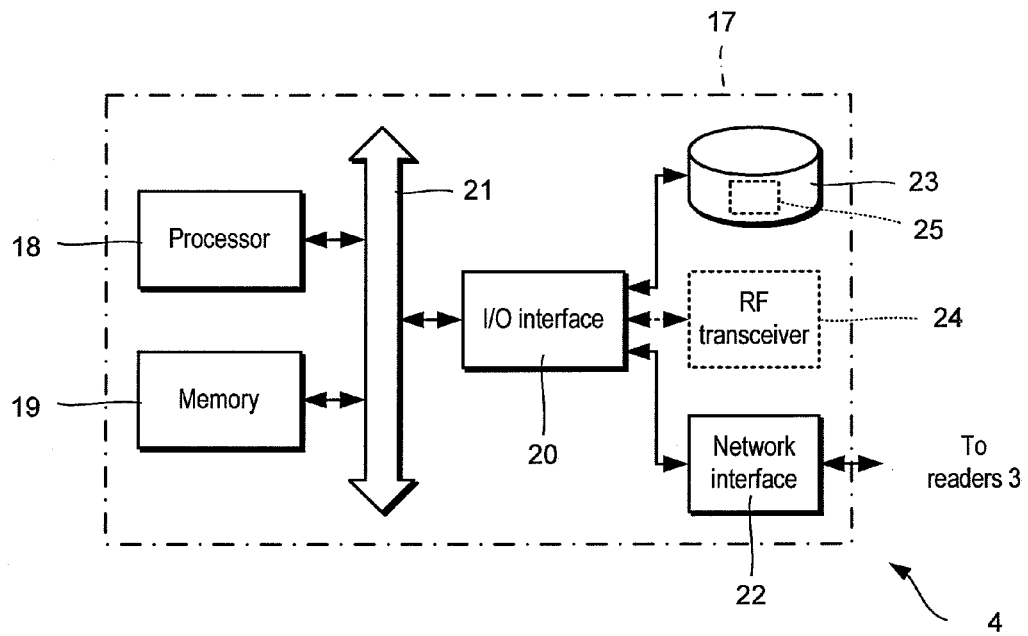
FIG. 9 illustrates a computer system implementing the process described in relation to FIG. 8.

Referring to FIG. 9, the controller 4 is implemented in software in a computer system 17. The computer system 17 includes a processor 18, memory 19 and an input/output (I/O) interface 20 operatively connected by a bus 21. The computer system 17 may include more than one processor. The I/O interface 20 is operatively connected to a network interface 22 for communicating with readers 3 and, if present, external systems 5 (FIG. 1) and to storage 23, for example, in the form of a hard disc drive (or drives).

Optionally, the computer system 17 may also serve as a reader 3, i.e. as an "intelligent reader". Thus, the I/O interface 20 is also operatively connected to a wireless transceiver 24, e.g. an RP transceiver.

Computer program code 25 which, when executed by the computer system 17, causes the computer system 17 to perform the process described in relation to FIG. 8 is stored on the hard drive 23 and loaded into memory 19 for execution by the processor 18.

If the system 17 also serves as a reader 3, then additional program code for executing the functions of the reader is also stored on the hard drive 23.

It will be appreciated that an "intelligent reader" may be arranged to be compact and so could be implemented as a computer-on-a-chip or as a chipset.

Figure 10:
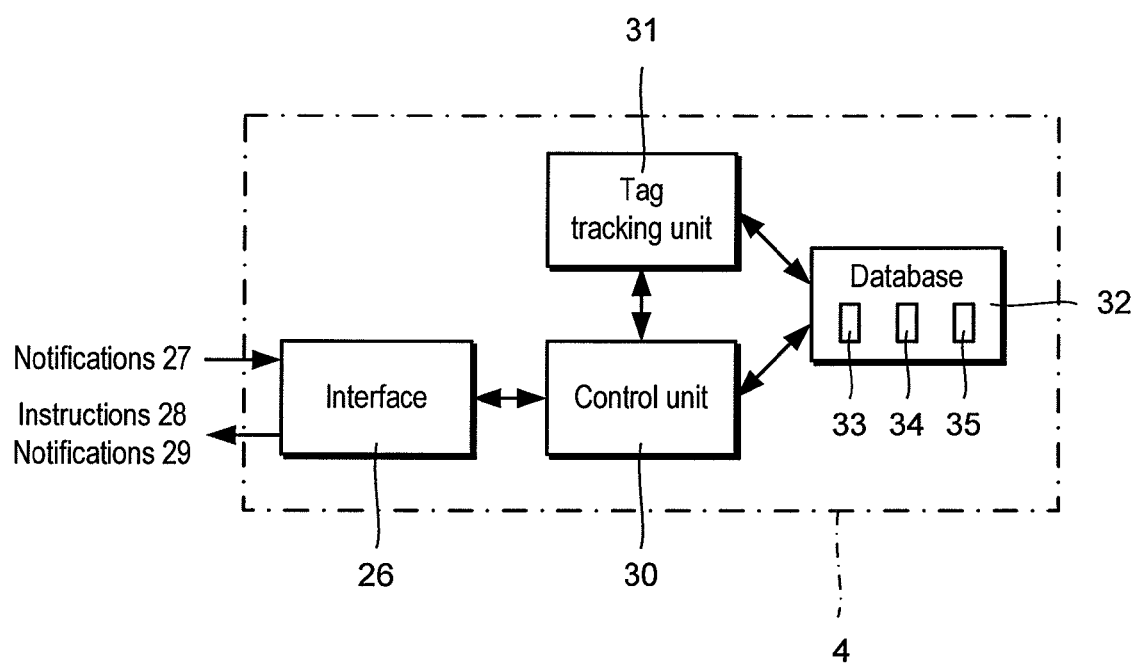
FIG. 10 is a schematic diagram illustrating some of the functions of the controller.

Referring to FIG. 10, the controller 4 comprises functional units including an interface 26 for receiving notifications 27 of external events, for example from readers 3 (FIG. 1) or external systems 5 (FIG. 1), and for sending instructions 28 to readers 3 (FIG. 1) or notifications 29 to external systems 5 (FIG. 1), a control unit 30 and a tag tracking unit 31. The control unit 30 and tracking unit 21 access one or more databases 32 which store, for example list of readers 33, layout 34 of the facility 11 (FIG. 6) and current locations 35 of tags 2 FIG. 1).

As explained earlier, the functions of the controller may be implemented by a separate entity, i.e. controller 4. However, the functions may be implemented by one or more readers 3 (FIG. 1). Moreover, the functions may be distributed amongst more than one reader or the functions may be repeated by more than one reader 3 (FIG. 1). Thus, the need for a separate entity can be avoided.

The process performed by the controller 4 can be modified for use in a domestic environment or in pubic places.

The process may also be modified to support or enable mobile RFID readers and to feed them with information about objects. For example, mobile readers can determine their approximate location at any moment by means of fixed "talkative" tags or location technologies such as Global Positioning Systems etc. Thus, a modified process can provide mobile readers with UIDs of all objects within their tracking area, so as to authorise and enable their interrogation.

Optionally, the system can interface with other systems in order to obtain UIDs of objects in the first place or feed other RFID systems downstream the supply chain. For example, the use of a discreet tag on product items can be complemented by the usage of active (bundling) tags in product bundles such as cases, pallets etc. Bundling information, including the UIDs of bundled items, can be either transmitted via inter-organisational transactions (electronic data interchange such as Advance Shipment Notices etc.), or stored in the bundling (active) tag. Upon reception of the bundle, the interrogation of the bundling tag can automatically trigger the interrogation of all bundled items, checking for delivery completeness and feeding the local privacy-friendly RFID system with their UIDs so as to start the tracking process described above. At its output, when tagged objects are sold or transferred to other facilities, the privacy-friendly RFID system could interface with their respective RFID systems by electronically sending the UIDs of transferred objects or with specialised personal UID-carrying devices such as mobile phones, flash memories, specialised watches, cameras etc. so object owners can interact with their discreet RFID tags, including the possibility of changing their passwords at will if so supported by the tags.

As explained earlier, in the RFID system hereinbefore described RFID tags cannot be easily queried by unauthorised parties. This helps to protect the privacy of the carrier of the tag and to make it harder to fake or duplicate the tag.

Since discreet tags 2 are not "talkative", interrogation requires a-priori knowledge of their UID. As explained earlier, a controller and a network of readers is able to predict, follow and appropriately interrogate tagged objects as they move or as they remain static.

When a discreet tag leaves the privacy-friendly RFID system, they cannot be surreptitiously queried because they do not reply to generic or semi-generic interrogations and their UIDs are unknown outside the system. Thus, consumer privacy is protected.

Embodiments of the present invention can be used in industrial or commercial applications, for example to enable automatic replenishment (or "re-stocking"), automatic check-out, to reduce counterfeiting, to locate misplaced products, to streamline distribution and logistics, to improve product recalls and so on. Embodiments of the present invention can also be used in domestic applications, for example to facilitate recycling, automatic selection of washing programmes by the washing machine and so on. Advantageously, the tags can be used without compromising consumers' privacy.

As explained earlier, the use of discreet tags requires that their interrogators have a-priori knowledge of their UID and, optionally, a password (as explained earlier, the password can be considered to be part of the UID). This helps to protect consumers from surreptitious interrogation of the tags they carry. If UIDs are properly secured in retailer or owner databases and are never linked to personal identification data of their owners, the use of discreet tags allows the creation of a privacy-friendly "Internet of Things", where objects remain anonymous and cannot or cannot easily be tracked without authorisation. Even if some of these UIDs accidentally leak out, it would be almost impossible to search for them on the street since they require specific interrogation by UID. Searching for a tag with a specific UID would be like "looking for a needle in a haystack".

Furthermore, if tags are used which allow consumers to change the password element of UIDs of objects in their possession, then this makes surreptitious interrogation much more difficult and virtually impossible. As long as their UID is known by the RFID system, discreet tags offer the same functionality as "talkative" RFID tags. If their UID is lost, they can no longer be interrogated and become useless and harmless from a privacy point of view.

Consumers may can save the UIDs of tags on their property in personal computing devices, such as mobile phones, portable computers, music players, flash memory devices and so on. This can be useful, after sale, in domestic applications. Optionally, the personal computing devices may require or prompt the user to change a password or even to change the password on their behalf.

Although interactions between discreet tags and readers can be performed without encryption or other security mechanisms and, thus, can be vulnerable to eavesdropping, this is usually not an issue since the interactions are short range so making eavesdropping difficult. Consumers could be warned about eavesdropping so as to avoid interacting with their tagged objects when eavesdropping is possible or likely. For instance, consumers could interface with their tagged objects within the privacy of their homes or in relatively quiet places.

The system can be used to enhance the usage of RFID tags in applications, such as anti-counterfeit and access control, because discreet tags cannot be easily read by unauthorised persons, thereby making faking (i.e. copying or "cloning" and subsequently using the copy or "clone") very difficult.

Many existing RFID readers are able to interrogate specific tags using their UID. This means that discreet tags can interoperate with some existing RFID technologies and does not require special readers or sophisticated parallel RFID infrastructures.

Since discreet tags are interrogated in sequence by their UID, they do not require the anti-collision mechanisms typical of "talkative" RFID tags, which may reply simultaneously and hence require random reply lags and re-interrogation. This means that the interrogation performance of discreet tags is, at least theoretically, superior than that of "talkative" tags.

It will be appreciated that many modifications may be made to the embodiments hereinbefore described. Although tags and readers have been described in the context of RFID, other forms of tags and readers, e.g. based on infra red communication can be used.

The invention claimed is:

1. A method of tracking an object tagged with a radio frequency identification tag having an identification code using a network of readers, wherein a reader interrogates the tag by transmitting the tag's identification code and, the tag responds to interrogation by transmitting a response if it receives the tag's identification code and does not respond if it receives an identification code which is not the tag's identification code, and wherein the network of readers has one or more uncovered areas not covered by an interrogation field of any of the readers, the method comprising:
identifying that an object tagged with the tag has left a covered area covered by an interrogation field of a reader;
identifying one or more readers monitoring points of access to one or more uncovered areas not covered by an interrogation field of any of the readers, the one or more uncovered areas located adjacently to the covered area such that the object passes directly into one of the one or more uncovered areas to leave the covered area;
directing the one or more readers to start interrogating the tag repeatedly and concurrently by transmitting the tag's identification code; and
in response to at least one of the interrogating readers receiving a response from the tag, directing other interrogating readers to stop interrogating the tag.

2. A method according to claim 1, wherein, in response to receiving a message comprising an identification code different from the tag's identification code, the tag does not identify itself.

3. A method according to claim 1, wherein, in response to receiving a message not comprising an identification code, the tag does not identify itself.

4. A method according to claim 1, wherein in response to receiving the tag's identification code, the tag identifies itself to the reader by transmitting a predefined message.

5. A method according to claim 1, wherein in response to receiving the tag's identification code, the tag identifies itself to the reader by transmitting the tag's identification code.

6. A method according to claim 1, comprising:
receiving a communication that the object has entered a system; and
instructing all readers to poll the identification code.

7. A method according to claim 6, comprising:
determining whether at least one reader receives a response;
identifying which readers do not receive a response; and
in response to at least one reader receiving a response, instructing the readers which do not receive a response to stop polling the identification code.

8. A method according to claim 1, comprising:
receiving a communication that the object has left a system; and
instructing readers to stop polling the identification code.

9. A method according to claim 1, further comprising:
determining whether the object has remained undetected for a given period of time; and
in response to determining that the object has remained undetected for the given period of time, instructing one or more further readers to seek the object, wherein the one or more further readers monitoring points of access to one or more further areas not covered by an interrogation field of any of the readers, the one or more further uncovered areas located adjacently to the one or more uncovered areas such that the object passes directly into one of the one or more further uncovered areas to leave the one or more uncovered areas.

10. A method according to claim 1, wherein the identification code comprises a fixed part and a user-changeable part.

11. A computer program product comprising a non-transitory computer readable medium storing thereon a computer program with computer-readable code which when executed by a computer, causes the computer to perform a method according to claim 1.

12. Apparatus for tracking an object tagged with a radio frequency identification tag having an identification code using a network of readers, wherein a reader interrogates the tag by transmitting the tag's identification code and the tag responds to interrogation by transmitting a response if it receives the tag's identification code and does not respond if it receives an identification code which is not the tag's identification code, and wherein the network of readers has one or more uncovered areas not covered by an interrogation field of any of the readers, the apparatus comprising:
  means for identifying that an object tagged with the tag has left a covered area covered by an interrogation field of a reader;
  means for identifying one or more readers monitoring points of access to one or more uncovered areas not covered by an interrogation field of any of the readers, the one or more uncovered areas located adjacently to the covered area such that the object passes directly into one of the one or more uncovered areas to leave the covered area; and
  means for directing the one or more readers to start interrogating the tag repeatedly and concurrently by transmitting the tag's identification code and in response to at least one of the interrogating readers receiving a response from the tag, directing other interrogating readers to stop interrogating the tag.

13. Apparatus according to claim 12, wherein the directing means is configured, in response to receiving a communication that the object has entered a system, to instruct all readers to poll the identification code.

14. Apparatus according to claim 12, wherein the directing means is configured to determine whether at least one reader receives a response, to identify which readers do not receive a response and, in response to at least one reader receiving a response, to instruct the readers which do not receive a response to stop polling the identification code.

15. Apparatus according to claim 14, wherein the directing means is configured, in response to receiving a communication that the object has left a system, to instruct readers to stop polling the identification code.

16. Apparatus according to claim 12, wherein the directing means is configured to determine whether the object has remained undetected for a given period of time; and, in response to determining that the object has remained undetected for the given period of time, to instruct readers in a wider area to seek the object.

17. Apparatus according to claim 12, wherein the directing means is computer connected to the network of readers.

18. Apparatus according to claim 12, further comprising: the network of readers.

19. Apparatus according to claim 18, wherein the directing means is distributed within the network of readers.

20. A reader for interrogating a radio frequency identification tag, wherein the reader is configured to interrogate the tag by transmitting the tag's an identification code and the tag responds to interrogation by transmitting a response if it receives the tag's identification code and does not respond if it receives an identification code which is not the tag's identification code, the reader connectable to other radio frequency identification tag readers to form a network of readers that has one or more uncovered areas not covered by an interrogation field of any of the readers, the reader comprising:
  means for identifying that an object tagged with the tag has left a covered area covered by an interrogation field of a reader;
  means for identifying one or more readers monitoring points of access to one or more uncovered areas not covered by an interrogation field of any of the readers, the one or more uncovered areas located adjacently to the covered area such that the object passes directly into one of the one or more uncovered areas to leave the covered area; and
  means for directing the one or more readers to start interrogating the tag repeatedly and concurrently by transmitting the tag's identification code and in response to at least one of the interrogating readers receiving a response from the tag, directing other interrogating readers to stop interrogating the tag.

21. Apparatus for tracking an object tagged with a radio frequency identification tag having an identification code using a network of readers, wherein a reader interrogates the tag by transmitting the tag's identification code and the tag responds to interrogation by transmitting a response if it receives the tag's identification code and does not respond if it receives an identification code which is not the tag's identification code, and wherein the network of readers has one or more uncovered areas not covered by an interrogation field of any of the readers, the apparatus comprising:
  a tracking unit arranged to identify that an object tagged with the tag has left a covered area covered by an interrogation field of a reader; and
  a control unit arranged to identify one or more readers monitoring points of access to one or more uncovered areas not covered by an interrogation field of any of the readers, the one or more uncovered areas located adjacently to the covered area such that the object passes directly into one of the one or more uncovered areas to leave the covered area and to direct the one or more readers to start interrogating the tag repeatedly and concurrently by transmitting the tag's identification code and, in response to at least one of the interrogating readers receiving a response from the tag, to direct other interrogating readers to stop interrogating the tag.

22. A method according to claim 1, further comprising:
  determining whether the object has remained undetected for a given period of time; and
  in response to determining that the object has remained undetected for the given period of time, instructing all readers within a facility to seek the object.

23. Apparatus according to claim 17, wherein at least some of the readers are arranged to monitor points of access to one areas not covered by an interrogation field of a reader.

24. Apparatus according to claim 23, wherein the at least some of the readers are located to cover points along possible paths of travel of the object.

25. Apparatus according to claim 24, wherein the at least some of the readers are located to take into account doors, walls and corridors.

* * * * *